United States Patent
Reeves et al.

(10) Patent No.: US 11,795,795 B2
(45) Date of Patent: Oct. 24, 2023

(54) FLUID EXPANSION CHAMBER WITH PROTECTED BELLOW

(71) Applicant: Baker Hughes ESP, Inc., Houston, TX (US)

(72) Inventors: Brian Paul Reeves, Edmond, OK (US); Chengbao Wang, Oklahoma City, OK (US); Steven Alan Howell, Oklahoma City, OK (US)

(73) Assignee: GE Oil & Gas ESP, Inc., Houston, TX (US)

( * ) Notice: Subject to any disclaimer, the term of this patent is extended or adjusted under 35 U.S.C. 154(b) by 0 days.

(21) Appl. No.: 15/507,457

(22) PCT Filed: Aug. 29, 2014

(86) PCT No.: PCT/US2014/053466
§ 371 (c)(1),
(2) Date: Feb. 28, 2017

(87) PCT Pub. No.: WO2016/032521
PCT Pub. Date: Mar. 3, 2016

(65) Prior Publication Data
US 2017/0306733 A1    Oct. 26, 2017

(51) Int. Cl.
*E21B 43/12* (2006.01)
*F04D 13/10* (2006.01)
(Continued)

(52) U.S. Cl.
CPC .......... *E21B 43/128* (2013.01); *F04D 13/062* (2013.01); *F04D 13/086* (2013.01);
(Continued)

(58) Field of Classification Search
CPC ........ F04B 47/06; F04D 13/086; F04D 13/10; F04D 13/062; F04D 25/0686; E21B 43/128
See application file for complete search history.

(56) References Cited

U.S. PATENT DOCUMENTS 3,947,709 A * 3/1976 Waltman ................. H02K 5/132
310/87
4,436,488 A * 3/1984 Witten .................... F04B 47/06
310/87
(Continued)

FOREIGN PATENT DOCUMENTS

RU    2 331 798 C2    8/2008
WO    2009/015035 A1    1/2009

OTHER PUBLICATIONS

International Search Report and Written Opinion issued in connection with corresponding PCT Application No. PCT/US2014/053466 dated May 8, 2015.
(Continued)

*Primary Examiner* — Christopher S Bobish
(74) *Attorney, Agent, or Firm* — Crowe & Dunlevy, P.C.

(57) ABSTRACT

An electric submersible pumping system includes a motor filled with motor lubricant, a pump driven by the motor, and a fluid expansion chamber connected to the motor. The fluid expansion chamber includes a seal bag filled with a seal bag lubricant and a bellows contained within the seal bag. The bellows includes an interior in fluid communication with the motor and an exterior in fluid communication with the seal bag lubricant.

20 Claims, 4 Drawing Sheets

(51) Int. Cl.
*F04D 13/06* (2006.01)
*F04D 13/08* (2006.01)
*F04D 25/06* (2006.01)
*H02K 5/132* (2006.01)

(52) U.S. Cl.
CPC ......... *F04D 13/10* (2013.01); *F04D 25/0686* (2013.01); *H02K 5/132* (2013.01)

(56) References Cited

U.S. PATENT DOCUMENTS

| | | | |
|---|---|---|---|
| 4,940,911 A * | 7/1990 | Wilson | H02K 5/132 |
| | | | 310/87 |
| 5,622,222 A | 4/1997 | Wilson et al. | |
| 6,242,829 B1 * | 6/2001 | Scarsdale | E21B 4/003 |
| | | | 310/87 |
| 6,688,860 B2 * | 2/2004 | Du | E21B 43/128 |
| | | | 310/87 |
| 6,851,935 B2 * | 2/2005 | Merrill | F04D 13/083 |
| | | | 277/336 |
| 6,981,853 B2 * | 1/2006 | Du | E21B 43/128 |
| | | | 310/87 |
| 7,217,107 B2 | 5/2007 | Du et al. | |
| 7,296,622 B2 | 11/2007 | Wang | |
| 7,530,391 B2 | 5/2009 | Hall et al. | |
| 7,654,315 B2 * | 2/2010 | Du | E21B 4/003 |
| | | | 166/105 |
| 7,708,534 B2 * | 5/2010 | Parmeter | F04D 29/0413 |
| | | | 417/423.3 |
| 7,806,670 B2 * | 10/2010 | Du | E21B 43/128 |
| | | | 310/87 |
| 8,221,092 B2 | 7/2012 | Chilcoat et al. | |
| 8,328,539 B2 * | 12/2012 | Watson | F04B 47/04 |
| | | | 166/105.3 |
| 8,430,649 B2 * | 4/2013 | Albers | E21B 43/128 |
| | | | 310/87 |
| 9,689,529 B2 * | 6/2017 | Meyer | F16N 29/02 |
| 9,970,272 B2 * | 5/2018 | Semple | E21B 43/128 |
| 9,988,887 B2 * | 6/2018 | Meyer | F04B 47/06 |
| 10,125,759 B2 * | 11/2018 | Pyron | E21B 43/128 |
| 2007/0140876 A1 | 6/2007 | Parmeter et al. | |
| 2011/0236233 A1 | 9/2011 | Merrill | |
| 2011/0274565 A1 * | 11/2011 | Tetzlaff | F04B 47/06 |
| | | | 417/321 |
| 2013/0216409 A1 * | 8/2013 | Geremia | F04D 13/062 |
| | | | 417/414 |
| 2015/0337843 A1 * | 11/2015 | Tanner | F04D 13/10 |
| | | | 417/53 |

OTHER PUBLICATIONS

International Preliminary Report on Patentability issued in connection with corresponding PCT Application No. PCT/US2014/053466 dated Feb. 28, 2017.

Office Action issued in connection with corresponding RU Application No. 2017106598 dated Dec. 5, 2018.

* cited by examiner

FLUID EXPANSION CHAMBER WITH PROTECTED BELLOW

BACKGROUND

Embodiments disclosed herein relate generally to the field of submersible pumping systems, and more particularly, but not by way of limitation, to an improved motor lubricant expansion system.

Submersible pumping systems are often deployed into wells to recover petroleum fluids from subterranean reservoirs. Typically, the submersible pumping system includes a number of components, including one or more fluid filled electric motors coupled to one or more high performance pumps located above the motor. When energized, the motor provides torque to the pump, which pushes wellbore fluids to the surface through production tubing.

Components commonly referred to as "seal sections" protect the electric motors and are typically positioned between the motor and the pump. In this position, the seal section provides several functions, including transmitting torque between the motor and pump, restricting the flow of wellbore fluids into the motor, protecting the motor from axial thrust imparted by the pump, and accommodating the expansion and contraction of motor lubricant as the motor moves through thermal cycles during operation.

Prior art seal sections typically include a "clean side" in fluid communication with the electric motor and a "contaminated side" in fluid communication with the wellbore. Bellows or bags have been used to separate the clean side of the seal section from the contaminated side. Although generally effective, prior art designs rely on the communication of fluid between the motor and the seal section. Because the drive shaft from the motor must pass through the seal section to transfer torque to the pump, there is an increased risk of fluid contamination. It is to this and other restrictions in the prior art that the preferred embodiments are directed.

SUMMARY

In preferred embodiments, the present invention includes an electric submersible pumping system that is configured to pump fluids from a wellbore. The electric submersible pumping system includes a motor filled with motor lubricant, a pump driven by the motor, and a fluid expansion chamber connected to the motor. The fluid expansion chamber includes a seal bag filled with a seal bag lubricant and a bellows contained within the seal bag. The bellows includes an interior in fluid communication with the motor and an exterior in fluid communication with the seal bag lubricant.

In another aspect, the preferred embodiments include an electric submersible pumping system for use in pumping fluids from a wellbore. The electric submersible pumping system includes a motor filled with a motor lubricant, a pump driven by the motor, and a fluid expansion chamber connected to the motor. The fluid expansion chamber includes an outer housing, one or more external vents extending through the outer housing to the wellbore, a seal bag within the outer housing, and a bellows contained within the seal bag. The bellows has an interior that is in fluid communication with the motor.

In yet another aspect, the preferred embodiments include a fluid expansion chamber for use in accommodating the expansion and contraction of lubricant from a motor within a submersible pumping system deployed in a wellbore. The fluid expansion chamber includes an outer housing, one or more external vents extending through the outer housing to the wellbore, a seal bag within the outer housing and a bellows contained within the seal bag. The bellows includes an interior that is in fluid communication with the motor.

DETAILED DESCRIPTION

Figure 1:
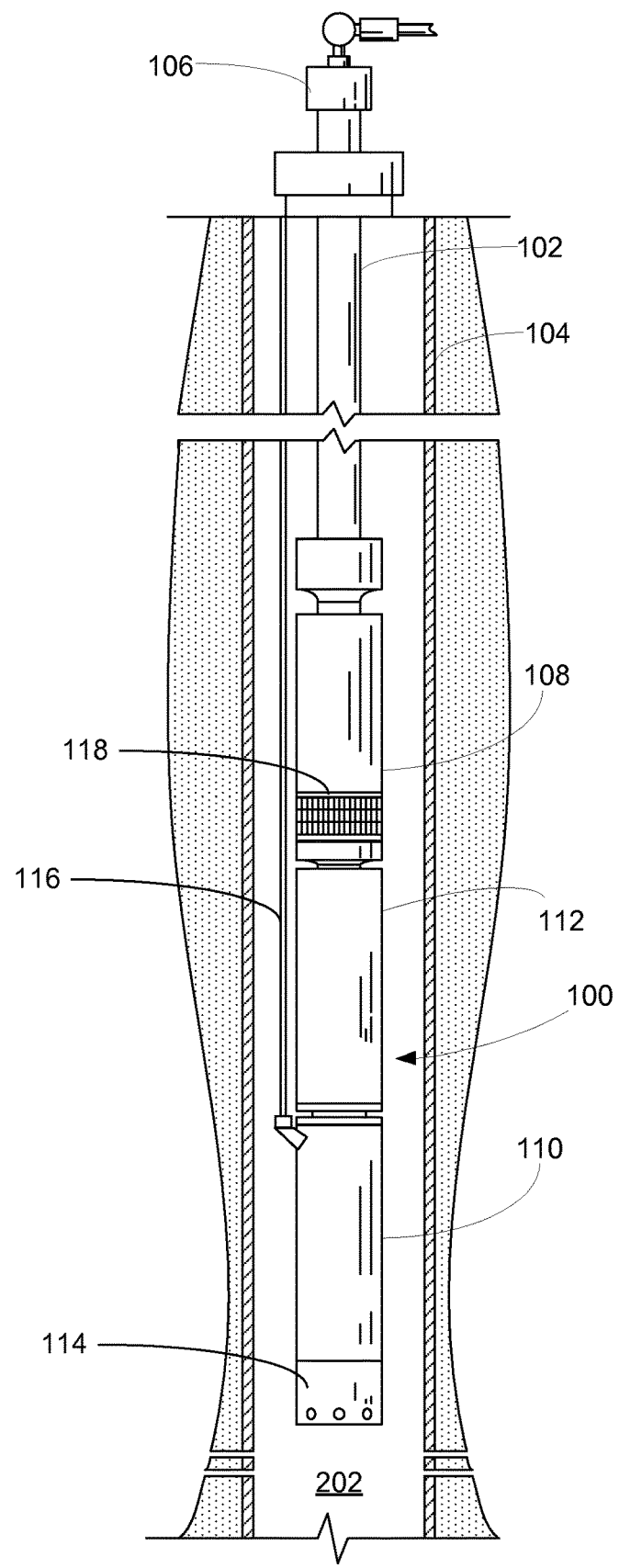
FIG. 1 depicts a submersible pumping system constructed in accordance with a preferred embodiment of the present invention.

In accordance with a first preferred embodiment of the present invention, FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas.

The pumping system 100 includes a pump 108, a motor 110, a seal section 112 and a fluid expansion module 114. The production tubing 102 connects the pumping system 100 to a wellhead 106 located on the surface. Although the pumping system 100 is primarily designed to pump petroleum products, it will be understood that the pumping system 100 can also be used to move other fluids. It will also be understood that, although each of the components of the pumping system are primarily disclosed in a submersible application, some or all of these components can also be used in surface pumping operations.

The motor 110 receives power from a surface-based facility through power cable 116. Generally, the motor 110 is configured to drive the pump 108. In a particularly preferred embodiment, the pump 108 is a turbomachine that uses one or more impellers and diffusers to convert mechanical energy into pressure head. In alternate embodiments, the pump 108 is configured as a positive displacement pump. The pump 108 includes a pump intake 118 that allows fluids from the wellbore 104 to be drawn into the pump 108. The pump 108 forces the wellbore fluids to the surface through the production tubing 102.

In the preferred embodiments, the seal section 112 is positioned above the motor 110 and below the pump 108. The fluid expansion module 114 is positioned below the motor 110. Although only one of each component is shown, it will be understood that more can be connected when appropriate, that other arrangements of the components are desirable and that these additional configurations are encompassed within the scope of preferred embodiments. For example, in many applications, it is desirable to use tandem-motor combinations, gas separators, multiple seal sections, multiple pumps, sensor modules and other downhole components.

It will be noted that although the pumping system 100 is depicted in a vertical deployment in FIG. 1, the pumping system 100 can also be used in non-vertical applications, including in horizontal and non-vertical wellbores 104.

Accordingly, references to "upper" and "lower" within this disclosure are merely used to describe the relative positions of components within the pumping system 100 and should not be construed as an indication that the pumping system 100 must be deployed in a vertical orientation.

Figure 2:
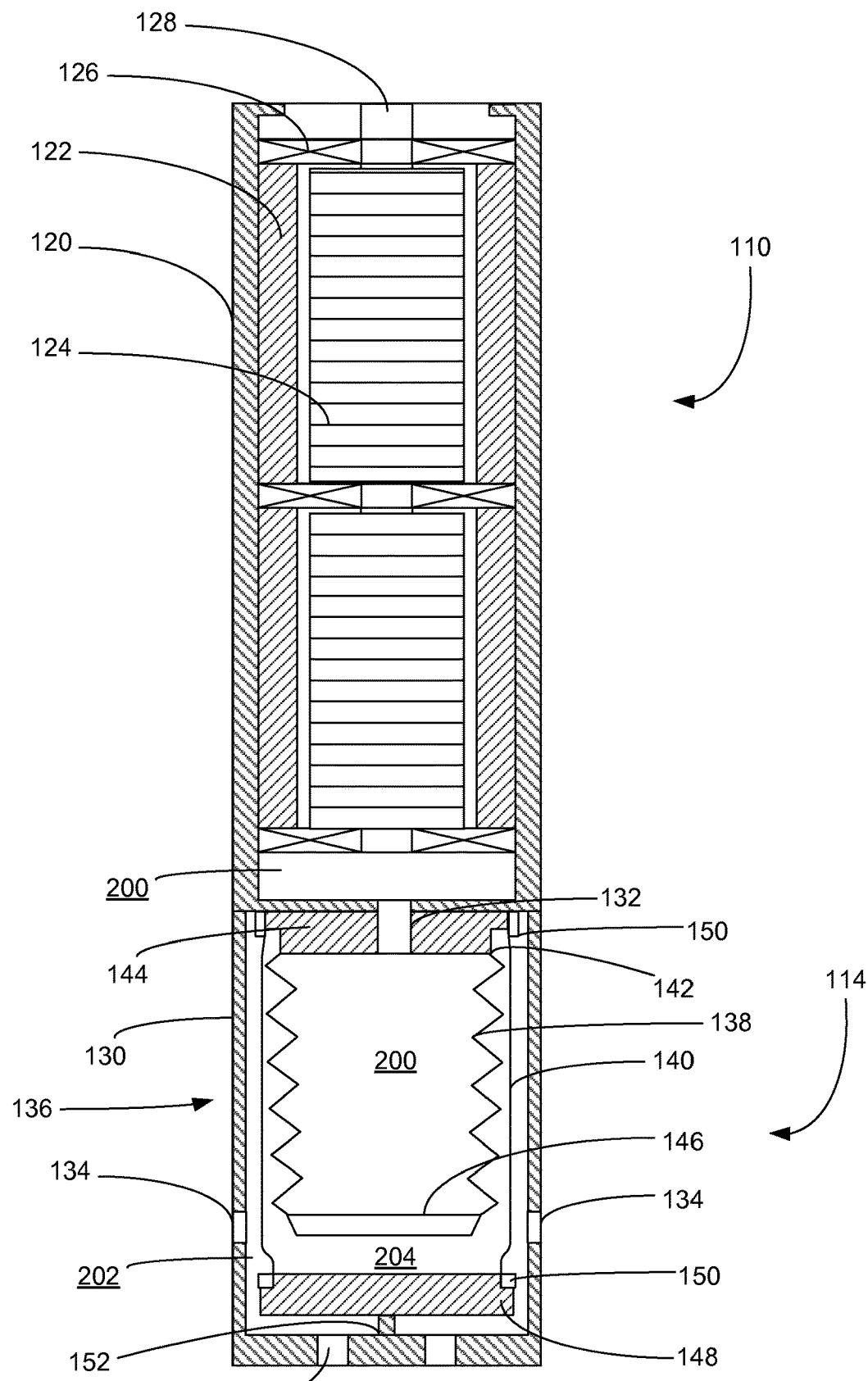
FIG. 2 provides a cross-sectional view of the motor and fluid expansion module constructed in accordance with a first preferred embodiment.

Turning to FIG. 2, shown therein is a cross-sectional view of the motor 110 and fluid expansion chamber 114. As depicted in the close-up view of the motor 110 in FIG. 2, the motor 110 includes a motor housing 120, stator assembly 122, rotor assembly 124, rotor bearings 126 and a motor shaft 128. The stator assembly 122 includes a series of stator coils (not separately designated) that correspond to the various phases of electricity supplied to the motor 110. The rotor assembly 124 is keyed to the motor shaft 128 and configured for rotation in close proximity to the stationary stator assembly 122. The size and configuration of the stator assembly 122 and rotor assembly 124 can be adjusted to accommodate application-specific performance requirements of the motor 110.

Sequentially energizing the various series of coils within the stator assembly 122 causes the rotor assembly 124 and motor shaft 128 to rotate in accordance with well-known electromotive principles. The motor bearings 126 maintain the central position of the rotor assembly 124 within the stator assembly 122 and oppose radial forces generated by the motor 110 on the motor shaft 128.

The motor 110 is filled with motor lubricant 200 during manufacture that reduces frictional wear on the rotating components within the motor 110. In particularly preferred embodiments, the motor lubricant 200 is a dielectric fluid. As the motor 110 cycles during use and as the motor 110 is exposed to the elevated temperatures in the wellbore 104, the dielectric motor lubricant 200 expands and contracts. It is desirable to prevent the dielectric motor lubricant 200 from becoming contaminated with wellbore fluids 202 and solids in the wellbore 104.

To accommodate the expansion and contraction of the motor lubricant 200, the fluid expansion chamber 114 is secured to the motor 110 and placed in fluid communication with the interior of the motor 110. Unlike the seal section 112, the fluid expansion chamber 114 does not accommodate the passage of a shaft from the motor 110. It will be appreciated that the fluid expansion chamber 114 may be used alone or in connection with the seal section 112.

The fluid expansion chamber 114 includes an outer housing 130, an inlet port 132, external vents 134 and a bellows assembly 136. The external vents 134 extend through the outer housing 130 to permit the exchange of wellbore fluids 202 in and out of the fluid expansion chamber 114. The size and number of external vents 134 is optimally determined to ensure that sand and other particulates do not accumulate inside the fluid expansion chamber 114.

The bellows assembly 136 includes a bellows 138 that is contained within a seal bag 140. In a particularly preferred embodiment, the bellows 138 is an edge-welded, metal bellows that exhibits a high degree of collapsible travel. In accordance with well-known mechanics, the bellows 138 is permitted to expand and contract as the accordion-folded sides extend and collapse. The bellows 138 provides a fluid impermeable barrier that prevents external wellbore fluids 202 from entering the motor 110, while permitting the expansion and contraction of the motor lubricant 200.

The bellows 138 includes a proximal end 142 that is connected to an upper support block 144 and a distal end 146 that is permitted to move within the seal bag 140. The inlet port 132 extends through the upper support block 144 to place an interior space of the bellows 138 in fluid communication with the interior of the motor 110.

The seal bag 140 forms a positive barrier between the bellows 138 and the wellbore fluids 202 inside the fluid expansion chamber 114. The seal bag 140 prevents contaminates and corrosive fluids from damaging the bellows 138. In the embodiment depicted in FIG. 1, the seal bag 140 is secured to the upper support block 144 and to a lower support block 148. Lock rings 150 can be used to secure the seal bag to the upper and lower support blocks 144, 148. In a particularly preferred embodiment the lock rings 150 are configured for threaded engagement with the upper and lower support blocks 144, 148.

Figure 3:
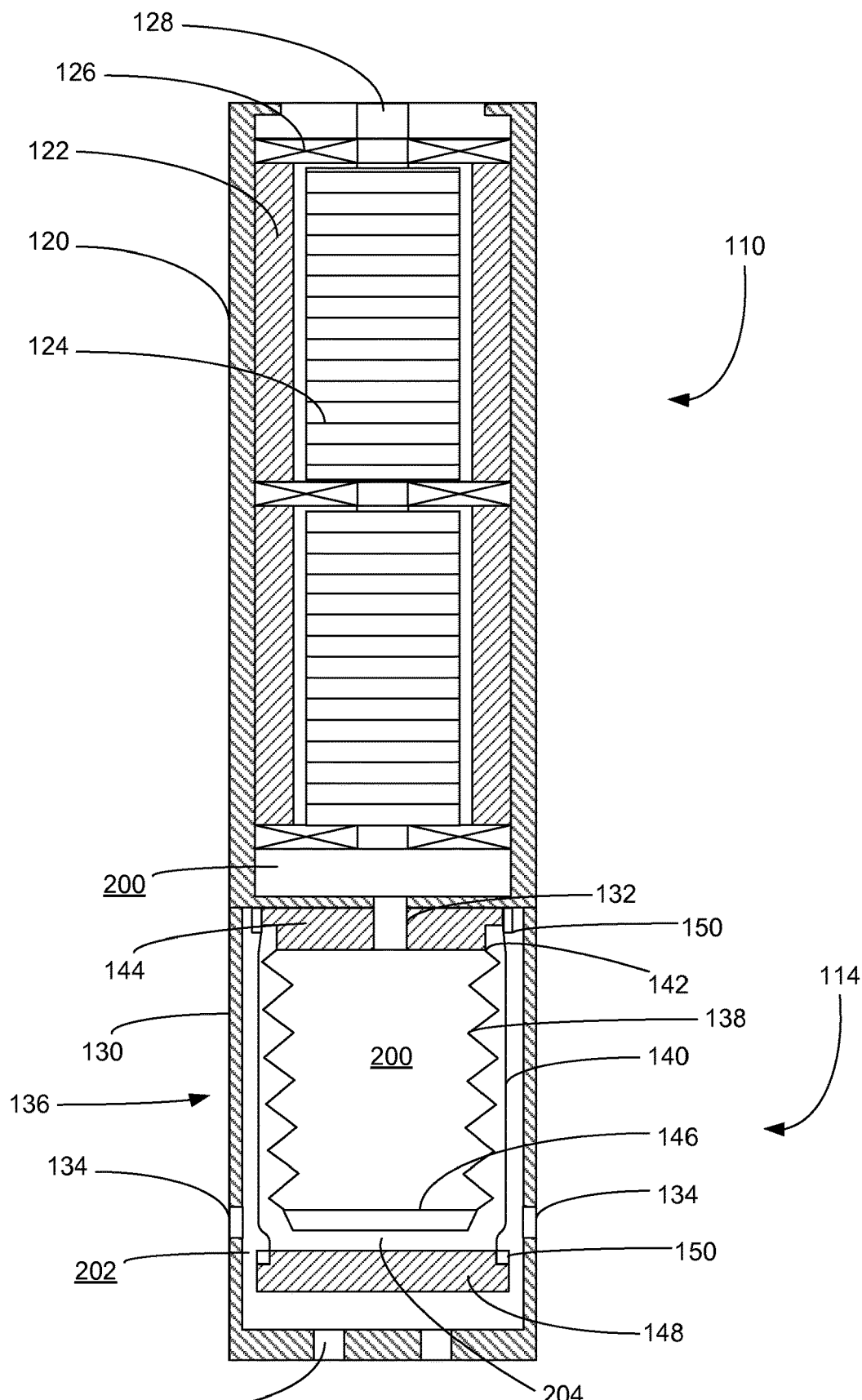
FIG. 3 provides a cross-sectional view of the motor and fluid expansion module constructed in accordance with a second preferred embodiment.
Figure 4:
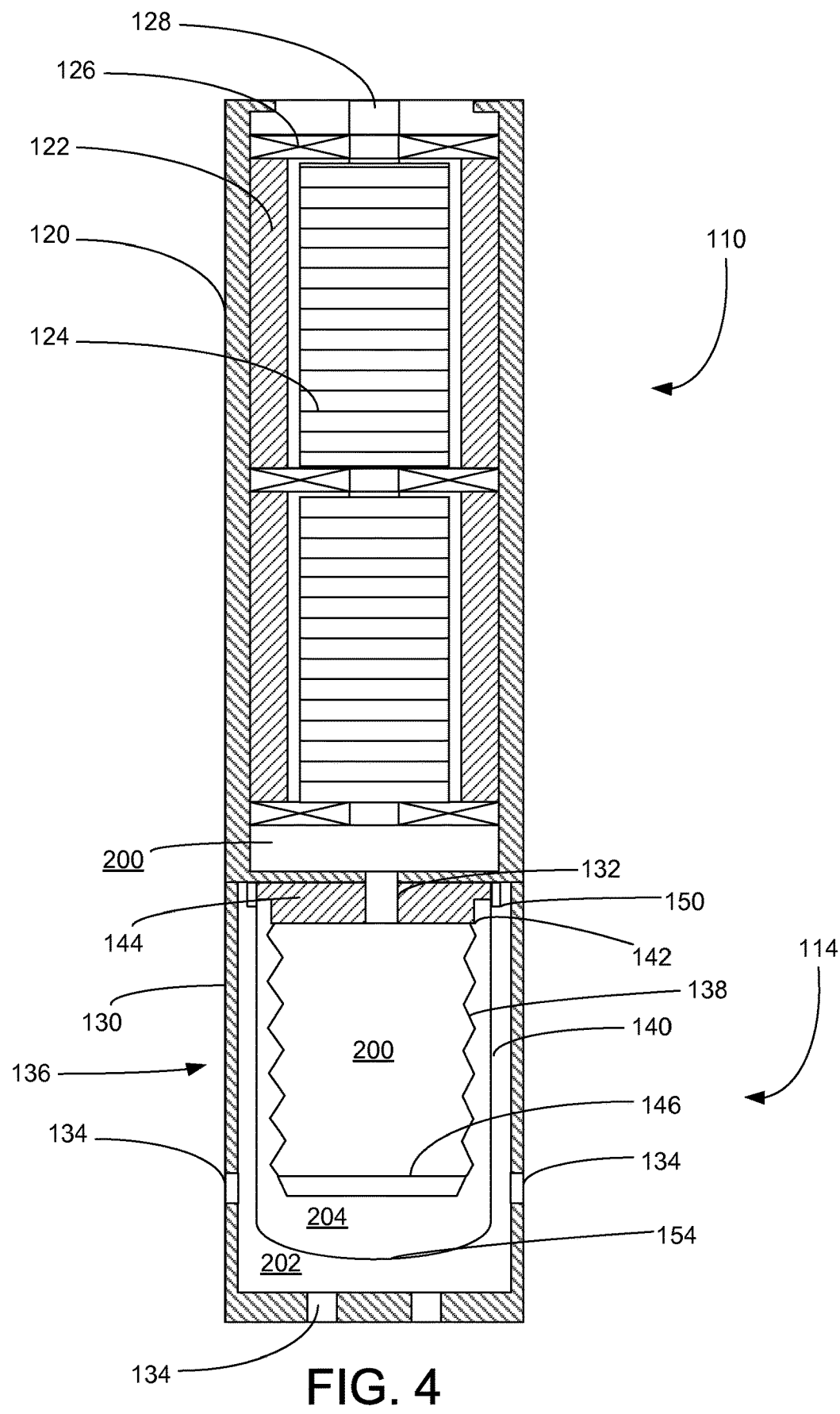
FIG. 4 provides a cross-sectional view of the motor and fluid expansion module constructed in accordance with a third preferred embodiment.

In the first preferred embodiment depicted in FIG. 2, the lower support block 148 is fixed in position within the fluid expansion chamber 114 by an anchor 152 that extends to the outer housing 130. In the second preferred embodiment depicted in FIG. 3, the lower support block 148 is not anchored to the outer housing 130 and the seal bag 140 is allowed to travel within the fluid expansion chamber 114. In the third preferred embodiment depicted in FIG. 4, the seal bag 140 is pre-formed with a closed-end 154 and no lower support block 148.

In each of the preferred embodiments, the seal bag 140 is constructed from a flexible, durable polymer. Suitable polymers include, but are not limited to, polytetrafluoroethylene (PTFE) and perfluoroalkoxy (PFA) polymers. During manufacture, the space between the seal bag 140 and the bellows 138 is filled with clean seal bag lubricant 204. The seal bag lubricant 204 may be the same as the motor lubricant 200, or it may be different from the motor lubricant 200.

As the volume of motor lubricant 200 expands during a heating cycle, the bellows 138 also expands and exerts pressure on the seal bag lubricant 204. The expansible seal bag 140 expands to accommodate the increase in pressure and displaces wellbore fluids 202 inside the fluid expansion chamber 114. During a cooling cycle, the volume of the motor lubricant is reduced and the bellows 138 contracts. As the bellows 138 contracts, the seal bag 140 also collapses. Wellbore fluids 202 are permitted to enter the fluid expansion chamber 114 to balance pressure gradient.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles disclosed herein to the full extent indicated by the broad general meaning of the terms in which the appended claims are expressed. It will be appreciated by those skilled in the art that the teachings described herein can be applied to other systems without departing from the scope and spirit of the present application.

What is claimed is:

1. A fluid expansion chamber for use in accommodating the expansion and contraction of lubricant from a motor within a submersible pumping system deployed in a wellbore, the fluid expansion chamber comprising:
   an outer housing;
   one or more external vents extending through the outer housing to the wellbore;
   a seal bag within the outer housing, wherein the seal bag is filled during manufacture with a volume of seal bag lubricant that is captured within the seal bag and wherein the seal bag does not permit discharge of the seal bag lubricant; and a bellows contained within the seal bag, wherein the bellows has an interior that is in fluid communication with the motor and wherein the bellows has accordion-folded sides that are configured to extend and contract within the seal bag, thereby causing the seal bag to expand and contract.

2. The fluid expansion chamber of claim 1, further comprising:
an upper support block; and
a lower support block.

3. The fluid expansion chamber of claim 2, wherein the bellows comprises:
a proximal end connected to the upper support block; and
a distal end that is permitted to move within the seal bag.

4. The fluid expansion chamber of claim 2, wherein the seal bag is constructed from polymers selected from the group consisting of fluoropolymers and nitrile rubbers.

5. The fluid expansion chamber of claim 2, wherein the seal bag is connected between the upper support block and the lower support block.

6. The fluid expansion chamber of claim 5, wherein the lower support block is anchored in a fixed position to the outer housing.

7. The fluid expansion chamber of claim 5, wherein the lower support block is not anchored in a fixed position to the outer housing.

8. The fluid expansion chamber of claim 1, further comprising an upper support block and wherein the seal bag comprises a pre-formed seal bag with an open proximal end attached to the support block and a closed distal end that is permitted to move within the outer housing.

9. The fluid expansion chamber of claim 1, wherein the bellows is filled with a motor lubricant.

10. An electric submersible pumping system for use in pumping fluids from a wellbore, the electric submersible pumping system comprising:
a motor, wherein the motor is filled with a motor lubricant;
a pump driven by the motor; and
a fluid expansion chamber connected to the motor, wherein the fluid expansion chamber comprises:
an outer housing;
one or more external vents extending through the outer housing to the wellbore;
a seal bag within the outer housing, wherein the seal bag is filled during manufacture with a volume of seal bag lubricant that is captured within the seal bag, and wherein the seal bag does not permit discharge of the seal bag lubricant; and
a bellows contained within the seal bag, wherein the bellows has an interior that is in fluid communication with the motor and wherein the bellows has accordion-folded sides that are configured to extend and contract within the seal bag, thereby causing the seal bag to expand and contract.

11. The electric submersible pumping system of claim 10, wherein the fluid expansion chamber further comprises:
an upper support block; and
a lower support block.

12. The electric submersible pumping system of claim 11, wherein the bellows comprises:
a proximal end connected to the upper support block; and
a distal end that is permitted to move within the seal bag.

13. The electric submersible pumping system of claim 11, wherein the seal bag is constructed from polymers selected from the group consisting of fluoropolymers and nitrile rubbers.

14. The electric submersible pumping system of claim 11, wherein the seal bag is connected between the upper support block and the lower support block.

15. The electric submersible pumping system of claim 14, wherein the lower support block is anchored in a fixed position to the outer housing.

16. The electric submersible pumping system of claim 10, further comprising an upper support block and wherein the seal bag comprises a pre-formed seal bag with an open proximal end attached to the support block and a closed distal end that is permitted to move within the outer housing.

17. The electric submersible pumping system of claim 10, further comprising a seal section connected between the motor and the pump.

18. An electric submersible pumping system comprising:
a motor, wherein the motor is filled with motor lubricant;
a pump driven by the motor; and
a fluid expansion chamber connected to the motor, wherein the fluid expansion chamber comprises:
a seal bag, wherein the seal bag is filled with a volume of seal bag lubricant during manufacture that is captured within the seal bag, and wherein the seal bag does not permit discharge of the seal bag lubricant; and
a bellows contained within the seal bag, wherein the bellows comprises:
edge-welded, accordion-folded sides that are configured to extend and contract within the seal bag;
an interior in fluid communication with the motor; and
an exterior in contact with the seal bag lubricant; and
wherein the extension and contraction of the bellows within the seal bag causes the seal bag to expand and contract.

19. The electric submersible pumping system of claim 18, wherein the motor lubricant and the seal bag lubricant are the same.

20. The electric submersible pumping system of claim 18, wherein the motor lubricant and the seal bag lubricant are not the same.

* * * * *